United States Patent
Jones, III

(10) Patent No.: US 10,073,785 B2
(45) Date of Patent: Sep. 11, 2018

(54) UP/DOWN PREFETCHER

(71) Applicant: Advanced Micro Devices, Inc., Sunnyvale, CA (US)

(72) Inventor: William Evan Jones, III, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/180,806

(22) Filed: Jun. 13, 2016

(65) Prior Publication Data

US 2017/0357587 A1    Dec. 14, 2017

(51) Int. Cl.
*G06F 12/08*     (2016.01)
*G06F 12/0862*   (2016.01)
*G06F 12/0842*   (2016.01)

(52) U.S. Cl.
CPC ...... *G06F 12/0862* (2013.01); *G06F 12/0842* (2013.01); *G06F 2212/1021* (2013.01); *G06F 2212/502* (2013.01); *G06F 2212/6026* (2013.01)

(58) Field of Classification Search
CPC ............. G06F 12/0842; G06F 12/0862; G06F 2212/1021; G06F 2212/502; G06F 2212/6026
See application file for complete search history.

(56) References Cited

U.S. PATENT DOCUMENTS

| | | | |
|---|---|---|---|
| 6,275,918 B1 | 8/2001 | Burky et al. | |
| 6,643,743 B1 * | 11/2003 | Hum | G06F 12/0862 711/134 |
| 2002/0091915 A1 | 7/2002 | Parady | |
| 2003/0191901 A1 | 10/2003 | Hill et al. | |
| 2005/0223175 A1 * | 10/2005 | Hepner | G06F 12/0862 711/137 |
| 2011/0208918 A1 * | 8/2011 | Raikin | G06F 12/0862 711/137 |
| 2011/0238922 A1 | 9/2011 | Hooker et al. | |
| 2011/0264860 A1 * | 10/2011 | Hooker | G06F 12/0862 711/122 |
| 2012/0066455 A1 | 3/2012 | Punyamurtula et al. | |
| 2014/0372736 A1 | 12/2014 | Greenhalgh | |

OTHER PUBLICATIONS

International Search Report and Written Opinion dated Mar. 13, 2017 for Application No. PCT/US2016/051850, 12 pages.
European Search Report dated Oct. 12, 2017 in EP Application No. 16201241.3, 5 pages.
European Search Report dated Jul. 6, 2017 in EP Application No. 16201241.3, 4 pages.

* cited by examiner

*Primary Examiner* — Aracelis Ruiz

(57) ABSTRACT

In a processing system comprising a cache, a method includes monitoring demand cache accesses for a thread to maintain a first running count of a number of times demand cache accesses for the thread are directed to cachelines that are adjacent in a first direction to cachelines that are targets of a set of sampled cache accesses for the thread. In response to determining the first running count has exceeded a first threshold, the method further includes enabling a first prefetching mode in which a received demand cache access for the thread triggers a prefetch request for a cacheline adjacent in the first direction to a cacheline targeted by the received demand cache access.

17 Claims, 4 Drawing Sheets

UP/DOWN PREFETCHER

BACKGROUND

Field of the Disclosure

The present disclosure relates generally to processing systems and, more particularly, to prefetching data in processing systems.

Description of the Related Art

Data prefetching frequently is utilized in a processing system to reduce wait states or other delays associated with accesses to data stored in memory. Typically, a processing system utilizes one or more prefetchers to monitor data accesses, and from the monitored data accesses predict which data may be needed by the processing system in the near future, and initiate the speculative fetching of the predicted data from a lower-level cache or from system memory. Conventional prefetchers typically attempt to identify a "stride" or "stream" in the pattern of data accesses by a thread, and utilize this stride or stream to predict the next data to be requested. However, in many cases such conventional prefetchers are unable to accurately detect "slow-moving" stride or stream patterns, typically as a result of size limitations (e.g., the amount of access "history" that the prefetcher can store), the number of streams operating within a given memory page, or streams that frequently, but not always, hit in the local cache. As a result, conventional prefetchers may fail to identify an otherwise valid stride or stream that may serve as a suitable basis for speculative prefetching of data.

BRIEF DESCRIPTION OF THE DRAWINGS

The present disclosure may be better understood and its numerous features and advantages made apparent to those skilled in the art by referencing the accompanying drawings. The use of the same reference symbols in different drawings indicates similar or identical items.

DETAILED DESCRIPTION

As described herein, a processing system utilizes an up/down prefetcher (UDP) to identify "slow-moving" stride or stream patterns in data accesses by threads, and generate speculative prefetch accesses based on such identified stride or stream patterns. In at least one embodiment, the UDP attempts to identify cases where the data set being accessed by a thread is being accessed in a relatively slowly ascending or descending fashion. The UDP does this by sampling demand cache accesses (for both cache hits and cache misses) for the thread and storing the addresses of the cachelines targeted by the sampled demand cache accesses in an address buffer. In parallel, for every demand cache access observed by the UDP, the UDP determines whether the demand cache access is addressed to a cacheline adjacent to the cacheline represented by an address in the address buffer. If the address of the demand cache access is directed to the cacheline that is adjacent in an upward direction (that is, at a higher memory address) to a cacheline of a buffered address entry, an up (+) hit count associated with the buffered address entry is incremented. Likewise, if the address of the demand cache access is directed to the cacheline that is adjacent in a downward direction (that is, at a lower memory address) to a cacheline of a buffered address entry, a down (−) hit count associated with the buffered address entry is incremented.

After a specified number of demand cache accesses have been evaluated or in response to another trigger event, the UDP sums the values of all of the up hit counters and sums the values of all of the down hit counters to determine a total up hit count and total down hit count, respectively. If the total up hit count is at or above a specified threshold, then the UDP enables "up" prefetching whereby for every demand cache access by the thread, the UDP triggers a prefetch for the cacheline adjacent in the upward direction to the cacheline targeted by the demand cache access. Likewise, if the total down count is at or above a specified threshold (which may be the same as, or different from, the threshold for the up count), then the UDP enables "down" prefetching whereby for every demand cache access by the thread, the UDP triggers a prefetch for the cacheline adjacent in the downward direction to the cacheline targeted by the demand cache access. In some embodiments, the UDP coordinates with other prefetchers such that an up prefetch or down prefetch, as the case may be, is only triggered when no other prefetcher has triggered a prefetch in response to a demand cache access.

Figure 1:
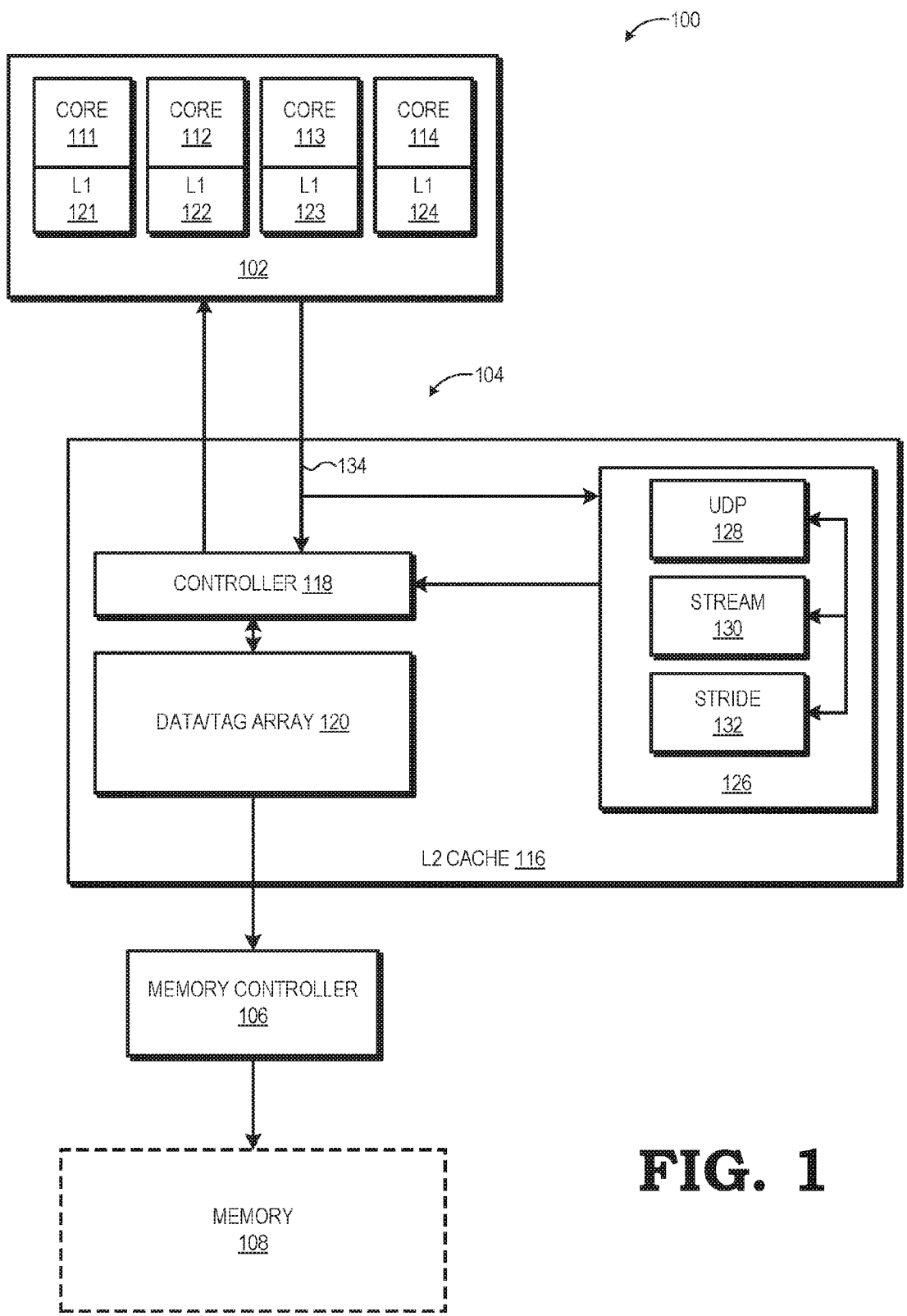
FIG. 1 is a block diagram of a processing system utilizing an up/down prefetcher in accordance with some embodiments.

Turning now to FIG. 1, a processing system 100 utilizing up/down prefetching is illustrated in accordance with at least one embodiment of the present disclosure. The processing system 100 may be implemented by any of a variety of compute-enabled electronic devices, such as a server, a desktop computer, a notebook computer, a tablet computer, a compute-enabled portable cellular phone (e.g., a "smart phone"), a compute-enabled watch or other wearable item, a personal digital assistant (PDA), a gaming console, and the like. In the depicted example, the processing system 100 includes at least one compute complex 102, a cache hierarchy 104, and a memory controller 106, which in turn may be coupled to a system memory 108 that is "on-chip" with the remainder of the processing system 100 or implemented as an external component.

The compute complex 102 includes one or more processor cores, such as the four processor cores 111, 112, 113, 114 in the depicted example. The processor cores may include central processing unit (CPU) cores, graphics processing units (GPU) cores, digital signal processor (DSP) cores, or a combination thereof. The cache hierarchy 104 includes one or more levels of caches to cache data accessed from the memory 108 and temporarily stored for access by one or more of the processor cores 111-114. In this particular example, the cache hierarchy 104 includes a set of four level 1 (L1) caches 121, 122, 123, 124 and a level 2 (L2) cache 116, whereby each of the L1 caches 121-124 is a private cache for a corresponding one of the processor cores 111-114 and part of the compute complex 102, while the L2 cache 116 is shared among the processor cores 111-114. It will be appreciated that still further cache levels, such as a level 3 (L3) cache may be employed as well. In this example, the up/down prefetching process described herein is performed at the L2 caching level. However, it will be appreciated that the up/down prefetching process is not limited to the L2 caching level, but instead may be implemented at any caching level, such as the L1 caching level or the L3 caching level, using the guidelines provided herein.

The L2 cache 116 includes a controller 118, a tag array and a corresponding data array (referred to herein collectively as "data/tag array 120"), and a prefetch block 126. The controller 118 operates to maintain the entries of the data/tag array 120 for cachelines cached at the L2 cache 116 in the data/tag array 120 and to process probes and other cache accesses from the L1 caches 121-124 and from the memory controller 106. The prefetch block 126 includes one or more prefetchers to monitor demand cache accesses being processed by the L2 cache 116 and to trigger speculative prefetch requests to be handled by the L2 controller 118 as appropriate. To this end, the prefetch block 126 includes at least an up/down prefetcher (UDP) 128. In the illustrated example, the prefetch block 126 further includes a stream prefetcher 130 that operates to trigger speculative prefetches based on conventional stream pattern analysis and a stride prefetcher 132 that operates to trigger speculative prefetches based on a conventional stride pattern analysis.

As a general operational overview, the cache hierarchy 104 operates to temporarily cache data for use by the processor cores 111-114. In some embodiments, data is cached in response to a demand cache access—that is, in response to a specific, non-speculative request for the data from one of the processor cores 111-114. Such cache demand accesses propagate through the cache hierarchy 104 from the lower level caches (L2 cache 116) to the higher level caches (L1 caches 121-124). At each cache level, the cache(s) at that level are probed to determine whether a valid copy of the requested data is cached at that level. If so, a cache hit is signaled and a copy of the data is provided to the source of the probe or request. If a valid copy is not present, a cache miss is signaled, and the cache access is propagated to the next higher cache level, and the process is repeated. In the event that the requested data is not present in the cache hierarchy 104, the memory controller 106 is tasked to access the requested data from the system memory 108, and the data accessed from the system memory 108 is then cached at one of the caches with in the cache hierarchy 104.

In parallel, the prefetchers 128, 130, 132 of the prefetch block 126 monitor the stream of cache accesses being handled by the L2 controller 118 (this stream represented by arrow 134, and thus also referred to herein as "stream 134"). Each of the prefetchers 128, 130, 132 attempts to detect a corresponding access pattern for each thread executing at the compute complex 102, and when a particular access pattern is detected, initiate issuance of speculative prefetch requests according to the detected access pattern. In some embodiments, the prefetchers 128, 130, 132 prioritize or otherwise coordinate their prefetch activities such that only a subset of the prefetchers 128, 130, 132 (e.g., only one) may trigger a speculative prefetch from a demand cache access. As noted above, the stream prefetcher 130 and stride prefetcher 132 utilize well-known conventional prefetch techniques. An example of the pattern detection and prefetch initiation process of the UDP 128 is described in greater detail below with reference to FIGS. 2-4.

Figure 2:
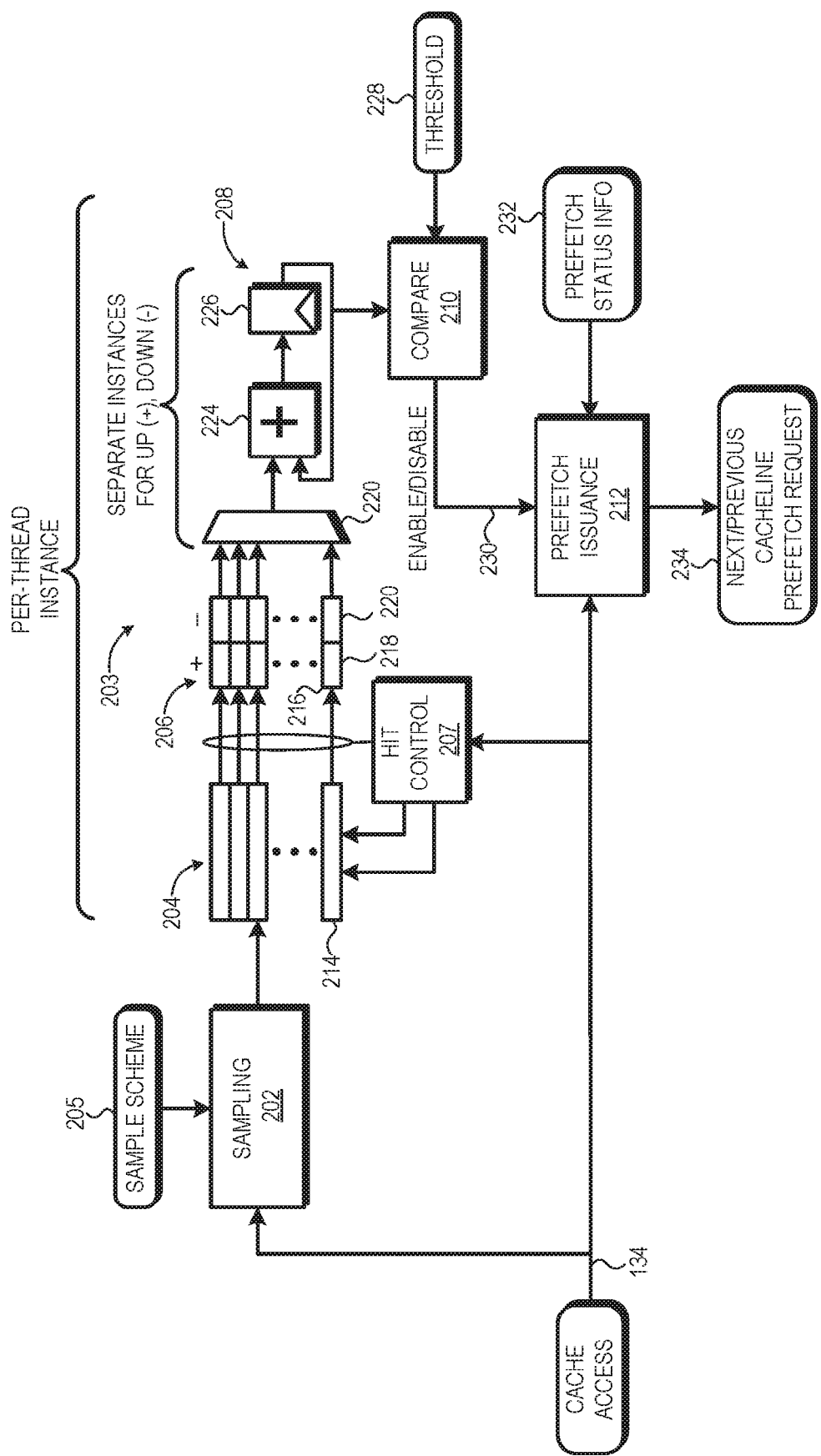
FIG. 2 is a block diagram illustrating an example implementation of the up/down prefetcher of FIG. 1 in accordance with some embodiments.

FIG. 2 illustrates an example configuration of the UDP 128 of the processing system 100 in accordance with at least one embodiment. In the depicted implementation, the UDP 128 includes a sampling module 202 and one or more thread-specific up/down count components 203. That is, the UDP 128 may implement a certain number of instances of the up/down count component 203, with each instance available for allocation to a corresponding thread executing at the compute complex 102. Thus, if the UDP 128 implements four instances of the up/down count component 203, then up to four threads may be separately tracked by the UDP 128. The sampling module 202 includes an input coupled to the controller 118 for monitoring the stream 134 of cache accesses at the L2 cache 116, an input to receive sampling scheme configuration data 205 representing the sampling scheme by which the sampling module 202 is to sample the cache accesses of the stream 134, and an output to provide a memory address (or portion thereof) representing the cacheline targeted each sampled cache access to the instance of the up/down count component 203 for the particular thread associated with the sampled cache access.

Each instance of the up/down count component 203 includes an up/down address buffer 204, an up/down hit buffer 206, a hit control module 207, a hit summation module 208, a compare module 210, and a prefetch issuance module 212. The up/down address buffer 204 includes a content-addressable memory (CAM) having a plurality of entries 214 (e.g., sixteen entries), with each entry 214 configured to store at least a portion of a memory address. To illustrate, in this example the UDP 128 operates on a cacheline basis, and assuming that bits 6-47 of a 48-bit physical address (that is, PA[47:6]) refer to the address of a cacheline's worth of data in memory (while PA[5:0] refer to the bytes within that cacheline), then the physical address portion PA[47:6] of an identified cache access (described below) may be stored in a corresponding entry 214 of the up/down address buffer 204. The hit summation module 208 comprises a plurality of entries 216, each entry 216 associated with a corresponding one of the entries 214 of the up/down address buffer 204, and including two sub-entries: an up hit count sub-entry 218 to store an up hit count for the address stored in the corresponding entry 214; and a down hit count sub-entry 220 to store a down hit count for the address stored in the corresponding entry 214.

Although a single instance of each of the hit summation module 208 and the compare module 210 is depicted in FIG. 2 for ease of illustration, each up/down count component 203 includes two instances the hit summation module 208 and the compare module 210: one hit summation module 208 and compare module 210 for tallying and evaluating the number of "up" hits using the up hit counts of the up hit count sub-entries 218; and one hit summation module 208 and compare module 210 for tallying and evaluating the number of "down" hits using the down hit counts of the down hit count sub-entries 220. Each of the two hit summation modules 208 implemented in an up/down hit component 203 includes a multiplexer 222, an adder module 224, and a tally module 226. The multiplexer 222 has a plurality of inputs, each coupled to a corresponding sub-entry 218/220, and an output coupled to an input of the adder module 224. The adder module 224 further includes an output coupled to an input of the tally module 226 and an input coupled to the output of the tally module 226. The tally module 226 may include a latch or other storage component to store a running up hit count or a running down hit count representing the total number of up hits or down hits represented in the up/down hit buffer 206, as described below. The compare module 210 operates to, in response to a trigger event, compare the running up/down hit count stored in the tally module 226 with a specified threshold 228 (which may be stored in, for example, a configuration register, hardcoded, and the like), and control an enable/disable signal 230 accordingly.

The prefetch issuance module 212 includes an input to receive the enable/disable signal 230, an input to receive cache accesses of the stream 134, and an output to selectively issue prefetch requests based on these inputs. Further, in some embodiments, the operation of the UDP 128 is coordinated with the operations of the other prefetchers 130, 132 of the prefetch block 126, in which case the prefetch issuance module 212 further includes an input to receive prefetch status information 232 from these other prefetchers, where the prefetch status information 232 indicates whether another one of these prefetchers has, or will be, issuing a prefetch request for a demand cache access observed in the stream 134.

Figure 3:
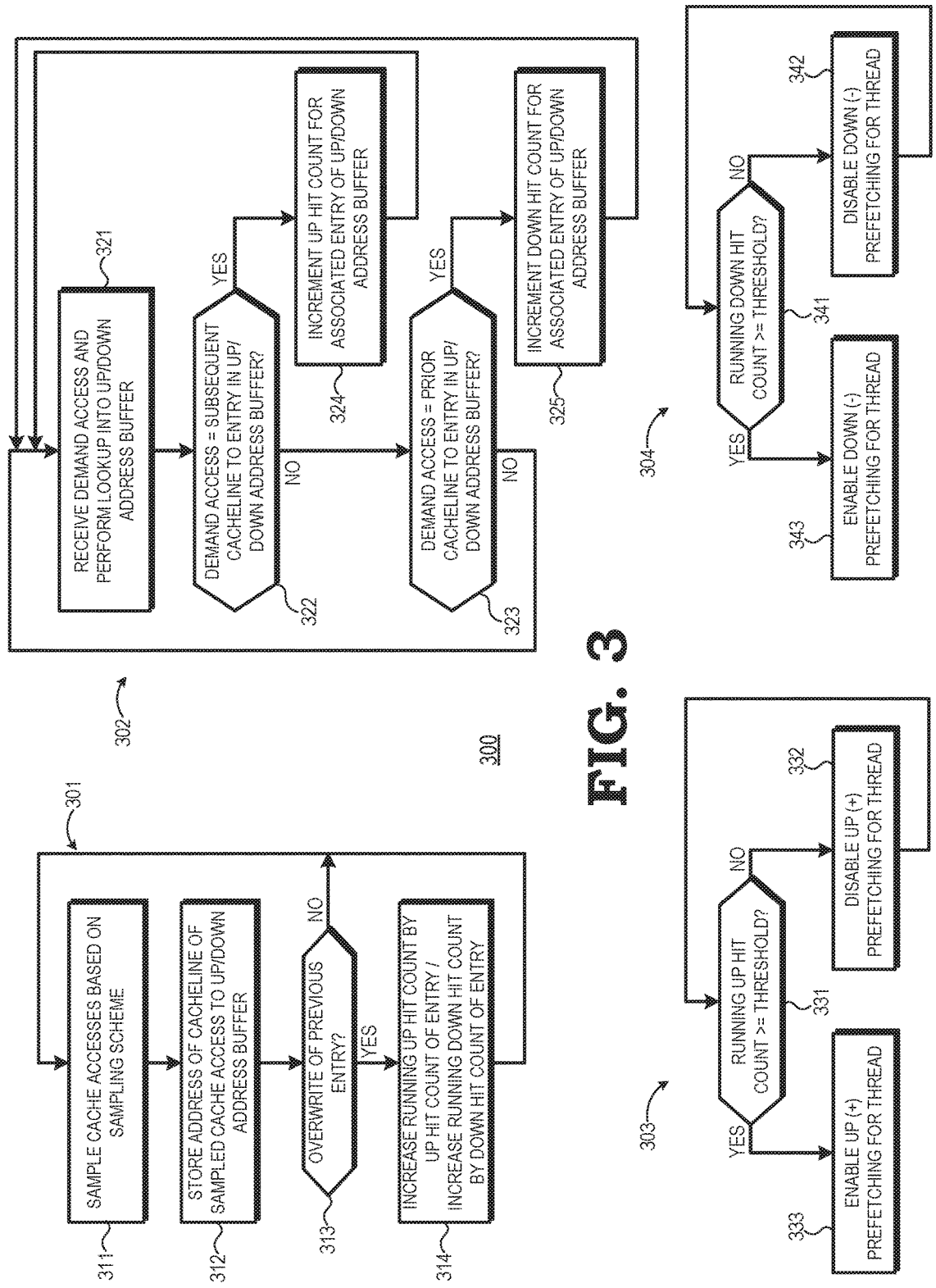
FIG. 3 is a flow diagram illustrating a method of operation of the up/down prefetcher of FIGS. 1 and 2 in accordance with some embodiments.

FIG. 3 illustrates a method 300 of operation of the implementation of the UDP 128 of FIG. 2 in accordance with some embodiments. As depicted, the operation of the UDP 128 includes at least four separate processes running in parallel, including: a cache access monitoring process 301, a hit counting process 302, an up prefetch control process 303, and a down prefetch control process 304. As a general summary, the processes 301, 302 represent the repeated training of the UDP 128 for a thread, and the processes 303, 304 represent the decision process repeatedly employed by the UDP 128 on whether to enable or disable up/down prefetching for the thread based on the training information obtained during processes 301, 302.

The cache access monitoring process 301 represents the process by which the UDP 128 monitors the stream 134 of cache accesses, samples cache accesses therefrom, and updates the up/down address buffer 204 accordingly. Thus, at block 311 the sampling module 202 samples a cache access from the stream 134 based on a sampling scheme specified by the sampling scheme configuration data 205. In at least one embodiment, the sampling is performed from both cache hits and cache misses, but as cache misses tend to be more indicative of a need for speculatively prefetched data, cache misses may be emphasized or otherwise prioritized in the sampling scheme. Further, cache accesses that represent speculative prefetches from a higher cache level (e.g., from L1 caches 121-124) typically are excluded from the sampling. Moreover, the percentage of cache accesses that are sampled may be based on a number of considerations, including the number of entries 214 in the up/down address buffer 204, the "rate" of the access patterns expected to be detected by the UDP 128, and the like. As one example, the sampling scheme configures the sampling module 202 to filter out all cache accesses that represent speculative prefetches from the lower-level caches and filter out seven of every eight cache accesses that are cache hits at the L2 cache 116, and then sample from the resulting filtered cache access stream one of every 512 cache accesses.

With a sampled cache access so selected, at block 312 the sampling module 202 writes the memory address portion PA[47:6] of the cacheline targeted by the sampled cache access to an entry 214 of the up/down address buffer 204. In at least one embodiment, the up/down address buffer 204 is operated in a round-robin or first-in, first-out (FIFO) manner such that once all of the entries 214 are full, the oldest entry 214 is selected for overwriting with the memory address portion of the cacheline targeted by a newly sampled cache access. However, overwriting an entry 214 triggers a process represented by blocks 313 and 314 to incorporate the up/down hit counts associated with the overwritten entry 214 into the running up hit count and running down hit count, respectively, maintained for the thread. This process is described below following the description of the process for generating the up/down hit counts for the entry. In any event, after the sampled cache access is processed, the process 301 returns to block 311 for the next cache access to be sampled from the stream 134.

Turning now to the hit counting process 302, this process serves to count the number of cache accesses targeted to the cachelines adjacent to cachelines represented in the up/down address buffer 204. Accordingly, the hit control module 207 monitors the stream 134 of cache accesses. When a demand cache access is detected, at block 321 the hit control module 207 determines whether the cache access is targeted to a cacheline that is adjacent to any of the cachelines represented in the up/down address buffer 204. To perform this process, the hit control module 207 determines the physical memory address portion A of the cacheline targeted by the demand cache access and performs two lookups into the up/down address buffer 204: a first lookup at block 322 for the memory address portion A−1 that represents the address of the cacheline that is previously adjacent to the cacheline targeted by the demand cache access (that is, adjacent in the downward direction); and a second lookup at block 323 for the memory address portion A+1 that represents the address of the cacheline that is subsequently adjacent to the cacheline targeted by the demand cache access (that is, adjacent in the upward direction). Note that although blocks 322 and 323 are depicted as occurring in series for ease of illustration, it will be appreciated that the lookups represented by these blocks may be performed in parallel.

As represented by block 322, if the first lookup hits on an entry 214 of the up/down address buffer 204, this indicates that there was a demand cache access for the cacheline immediately following the cacheline represented in the hit entry 214. That is, the demand cache access was targeted to a cacheline that is "up" from, or immediately following, the cacheline represented by the hit entry 214. Thus, in response the hit control module 207 increments the up hit count stored in the up hit count sub-entry 218 associated with the hit entry 214 at block 324. That is, the hit control module 207 identifies that a demand cache access is directed to the cacheline that is one cacheline "up" from a cacheline represented in the up/down address buffer 204 and, in response, increments the up hit count of that cacheline in the up/down address buffer 204 by one to record this match. Alternatively, as represented by block 323, if the second lookup hits on an entry 214 of the up/down buffer 204, this indicates that there was a demand cache access for the cacheline immediately preceding the cacheline represented in the hit entry 214. That is, the demand cache access was targeted to a cacheline that is "down" from, or immediately preceding, the cacheline represented by the hit entry 214. Thus, in response the hit control module 207 increments the down hit count stored in the down hit count sub-entry 220 associated with the hit entry 214 at block 325. That is, the hit control module 207 identifies that a demand cache access is directed to the cacheline that is one cacheline "down" from a cacheline represented in the up/down address buffer 204 and, in response, increments the down hit count of that cacheline in the up/down address buffer 204 by one to record this match. In the event that both of the lookups miss, this indicates that the demand cache access was not directed to a cacheline immediately adjacent to any of the cachelines represented in the up/down address buffer 204, and thus the demand cache access does not affect the up/down hit counts.

As demonstrated by the process 302, the up hit count stored in the up hit count sub-entry 218 represents the number of occurrences of a demand cache access targeted to a cacheline that was "up" from the cacheline represented by the entry 214 associated with up hit count sub-entry 218. The down hit count stored in the down hit count sub-entry 220 correspondingly represents the number of occurrences of a demand cache access targeted to a cacheline that was "down" from the cacheline represented by the entry 214 associated with up hit count sub-entry 218. As such, before an entry 214 storing a valid cacheline address is overwritten, the up hit counts and down hit counts associated with this cacheline are included in the running up hit count and running down hit count, respectively, for the thread. Accordingly, returning to process 301, when the sampling module 202 is to store the cacheline address of a newly sampled cache access to an identified entry 214 the up/down address buffer 204, at block 313 the sampling module 202 determines whether a valid cacheline is about to be overwritten in the identified entry 214. If not, then there are no valid up/down hit counts that have yet to be accounted for, and thus the cacheline address can be stored to the entry 214 without further action.

However, if there is a valid cacheline address already stored in the identified entry 214, at block 314 the overwrite of the valid cacheline may operate as a trigger event for the hit summation modules 208 to incorporate the up hit count and down hit count of the sub-entries 218, 220 associated with the identified entry 214 into the running up hit count and running down hit count, respectively. Thus, for the up hit count, the sampling module 202 signals the index of the identified entry 214 to the multiplexer 222 of the hit summation module 208 for the running up hit count. In response, the multiplexer 222 accesses the up hit count stored in the up hit count sub-entry 218 with this same index and forwards the access up hit count to the adder module 224. The adder module 224 then adds this up hit count to the current value of the running hit count stored in the tally module 226, and then stores the result to the tally module 226 as an update to the running hit count stored therein. The same process is performed by the hit summation module 208 that maintains the running down hit count with respect to the running down hit count and the down hit count stored at the sub-entry 220 at the indicated index. Further, after the up hit count and down hit count are added to the running up hit count and running down hit count, respectively, the sub-entries 218, 220 at the index are reset to zero for the new cacheline address to be stored in the corresponding entry 214.

As noted above, processes 303 and 304 represent the processes of periodically selectively enabling/disabling up prefetching and down prefetching, respectively, based on the running up/down hit counts stored at the up/down hit summation modules 208. Process 303 represents the process for enabling up prefetching. Accordingly, after some specified number of cache accesses have been sampled at block 311 of process 301 or some other trigger event (e.g., the activation of a countdown timer), the compare module 210 for the "up" instance is enabled. Once enabled, at block 331 the compare module 210 receives the current running up hit count from the tally module 226 and compares the current running hit count to the specified threshold 228 for "up" cacheline hits. In at least one embodiment, the specified threshold 228 represents a watermark for the number of up cacheline hits for the thread. To illustrate, the threshold 228 may be set to forty-eight up hits before up prefetching is enabled. The particular value for the specified threshold 228 may be selected via modeling, empirical analysis, and the like. By default, up prefetching is disabled, and as illustrated by block 332, while the running up hit count is less than the threshold 228, up prefetching remains disabled, and process 303 is repeated for another polling cycle. However, as illustrated by block 333, when the running up hit count rises to or above the threshold 228, the minimum number of up cacheline hits deemed to be suitable for enabling up prefetching has occurred, and thus the compare module 210 configures the enable/disable signal 230 for up prefetching so as to indicate that up prefetching has been enabled for the thread.

Process 304 represents the process for enabling down prefetching, and proceeds in a similar manner as process 303. Accordingly, after some specified number of cache accesses have been sampled at block 311 of process 301, the compare module 210 for the "down" instance is enabled. Note that this specified number of cache accesses for process 304 may differ from the number for process 303. Once enabled, the compare module 210 for the "down" instance begins polling cycles. For each polling cycle, at block 341 the compare module 210 receives the current running down hit count from the tally module 226 and compares the current running down count to the specified threshold 228 for "down" cacheline hits. Note that the threshold 228 for "down" cacheline hits may differ from the threshold 228 for "up" cacheline hits. As with up prefetching, down prefetching may be disabled by default, and as illustrated by block 342, while the running down hit count is less than the threshold 228, down prefetching remains disabled, and process 304 is repeated for another polling cycle. However, as illustrated by block 343, when the running down hit count rises to or above the threshold 228, the minimum number of down cacheline hits deemed to be suitable for enabling down prefetching has occurred, and thus the compare module 210 configures the enable/disable signal 230 for down prefetching so as to indicate that down prefetching has been enabled for the thread.

Figure 4:
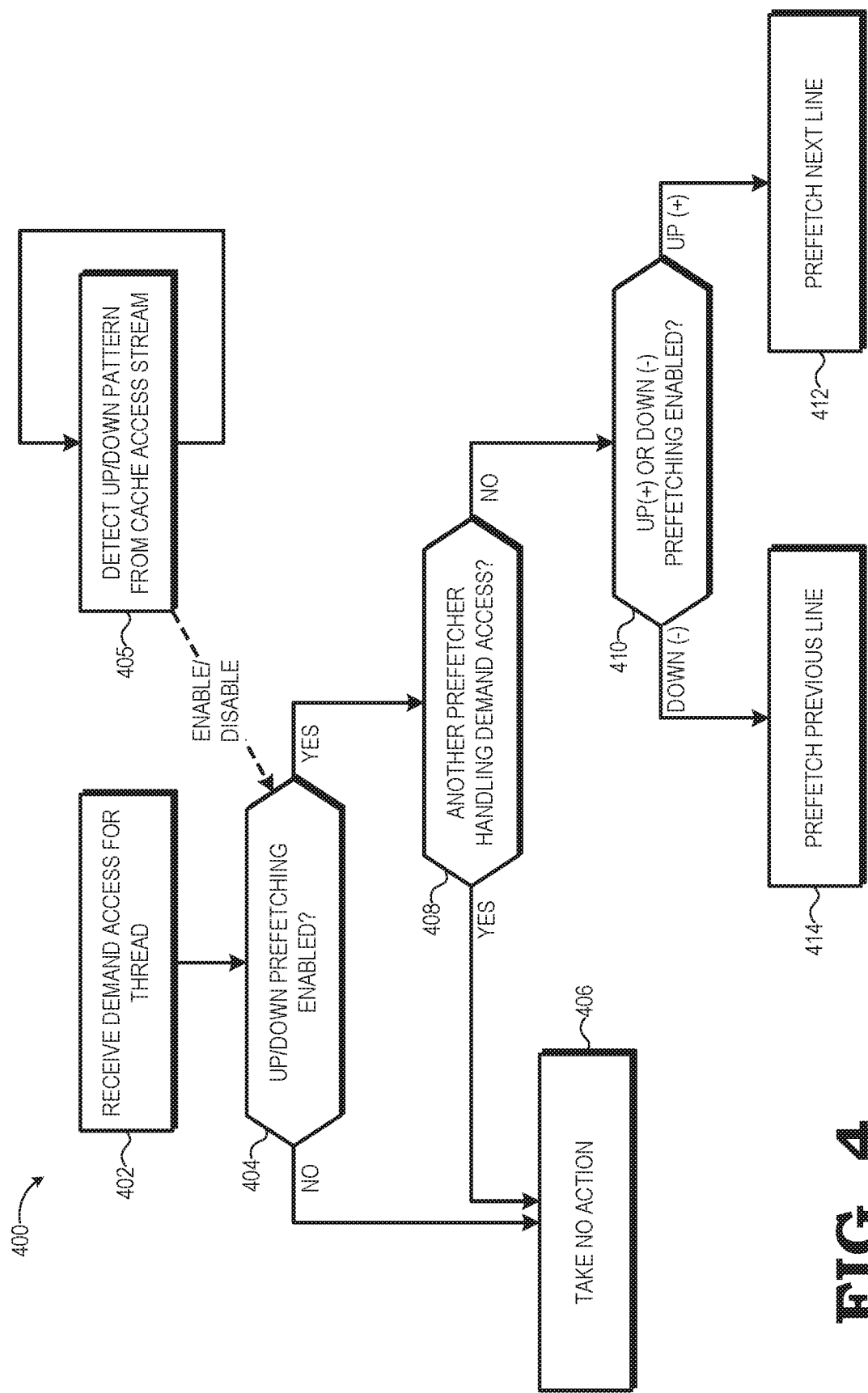
FIG. 4 is a flow diagram illustrating a method for prefetching utilizing a set of prefetchers including the up/down prefetcher of FIGS. 1 and 2 in accordance with some embodiments.

FIG. 4 illustrates a method 400 of operation of the prefetch issuance module 212 in coordination with the processes 301-304 of FIG. 3 in accordance with at least one embodiment. As explained above, the UDP 128 and the other prefetchers 130, 132 of the prefetch block 126 operate to detect patterns in cache accesses for a thread, and from these patterns, speculatively predict data expected to be needed by the thread and issue speculative prefetch requests for this predicted data accordingly. The UDP 128 in particular operates to detect a relatively slow moving pattern whereby a thread moves through a block of data, and accesses cachelines in sequence, either as an "up" sequence (that is accessing adjacent cachelines from lower memory addresses to higher memory addresses) or as a "down" sequence (that is accessing adjacent cachelines from higher memory addresses to lower memory addresses). When such a pattern is detected, as represented by processes 303, 304 the UDP 128 enables either up prefetching or down prefetching, as appropriate from the direction of the detected pattern, and selectively triggers a speculative prefetch for an adjacent cacheline for each demand cache access detected for the thread.

Accordingly, method 400 initiates at block 402 with the receipt by, or notification of, a demand cache access for the thread at the prefetch issuance module 212. At block 404, the prefetch issuance module 212 assesses the state of the enable/disable signal 230 for the "up" instance and the enable/disable signal 230 for the "down" instance to determine whether either of up prefetching or down prefetching is enabled. As described above and as depicted by block 405, the up/down count component 203 associated with the thread maintains a running count of the number of demand cache accesses that hit on a previous adjacent cacheline (running down hit count) and the number of demand cache accesses that hit on a next adjacent cacheline (running up hit count), and when one of the running up hit count or the running down hit count exceeds its associated threshold 228, a corresponding adjacent access pattern is detected, and either up prefetching or down prefetching is enabled. In at least one embodiment, only one of the two prefetching modes may be enabled at any given time, in which case the enablement of the other prefetching mode is suppressed.

If neither up prefetching nor down prefetching is enabled, at block 406 the prefetch issuance module 212 takes no action in response to the demand cache access received at block 402. Otherwise, if one of up prefetching or down prefetching is enabled, at block 408 the prefetch issuance module 212 analyzes the prefetch status information 232 exchanged by the prefetchers 128, 130, 132 of the prefetch block 126 to determine whether another prefetcher will be issuing a prefetch request in response to the demand cache access received at block 402. In at least one embodiment the UDP 128 operates as a "backup" prefetcher to the prefetchers 130, 132, and thus if one of these prefetchers signals that prefetcher has, or will be, issuing a prefetch request for the demand cache access, the UDP 128 suppresses any issuance of its own prefetch request by taking no further action, as represented again by block 406.

Otherwise, if the UDP 128 is not de-prioritized relative to the prefetchers 130, 132, or if no other prefetcher is handling the demand cache access, at block 410 the prefetch issuance module 212 determines which type of prefetching is enabled at the UDP 128 for the thread. If up prefetching is enabled, at block 412 the prefetch issuance module 212 issues a speculative prefetch request 234 (FIG. 2) for the cacheline subsequently adjacent to the cacheline that is the target of the demand cache access received at block 402 (that is, is adjacent in the upward direction). Conversely, if down prefetching is enabled, at block 414 the prefetch issuance module 212 issues a speculative prefetch request 234 (FIG. 2) for the cacheline previously adjacent to the cacheline that is the target of the demand cache access received at block 402 (that is, is adjacent in the downward direction). As a result of the prefetch request 234 issued at either block 412 or block 414, the adjacent cacheline is prefetched to the L2 cache 116, and thus may be available for the compute complex 102 if the detected adjacent access pattern is accurate, and thus reducing or eliminating the delay that otherwise would occur when the cache access for that adjacent cacheline resulted in a cache miss and thus place the thread in a wait state until the adjacent cacheline was fetched from the system memory 108. As such, the UDP 128, acting as an independent prefetcher or as a backup to other prefetchers, may operate to identify adjacent access patterns that span too many accesses (that is, are too "slow moving") to be detected by conventional stride/stream prefetchers, and thus allow the cache hierarchy 104 to better anticipate the data access needs of the compute complex 102 for more efficient data access and processing.

In some embodiments, the apparatus and techniques described above are implemented in a system including one or more integrated circuit (IC) devices (also referred to as integrated circuit packages or microchips), such as the processing system described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A non-transitory computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a processing system comprising a cache, a method comprising:
   sampling cache accesses for a thread according to a sampling scheme to determine a set of sampled cache accesses, wherein the sampling scheme includes sampling based on a percentage of cache accesses by the thread, wherein the sampling scheme prioritizes sampling of cache accesses that result in cache misses at the cache over cache accesses that result in cache hits at the cache by sampling more frequently from cache misses than from cache hits;
   monitoring demand cache accesses for the thread to maintain a first running count of a number of times demand cache accesses for the thread are directed to cachelines that are adjacent in a first direction to cachelines that are targets of the cache accesses of the set of sampled cache accesses for the thread; and
   in response to determining the first running count has exceeded a first threshold, enabling a first prefetching mode in which a received demand cache access for the thread triggers a prefetch request for a cacheline adjacent in the first direction to a cacheline targeted by the received demand cache access.

2. The method of claim 1, wherein the first direction comprises a next cacheline direction.

3. The method of claim 1, wherein the first direction comprises a previous cacheline direction.

4. The method of claim 1, further comprising:
   in response to the first prefetching mode being enabled and in response to receiving a demand cache access for the thread, identifying a cacheline that is adjacent in the first direction to a cacheline targeted by the demand cache access and issuing a prefetch request for the identified cacheline.

5. The method of claim 1, further comprising:
   in response to the first prefetching mode being enabled, in response to receiving a demand cache access for the thread, and in response to an indication that another prefetcher of the processing system is not issuing a prefetch request in response to the demand cache access, identifying a cacheline that is adjacent in the first direction to a cacheline targeted by the demand cache access and issuing a prefetch request for the identified cacheline; and
   in response to the first prefetching mode being enabled, in response to receiving a demand cache access for the thread, and in response to an indication that another prefetcher of the processing system is issuing a prefetch request in response to the demand cache access, suppressing issuance of a prefetch request for the cacheline that is adjacent in the first direction to the cacheline targeted by the demand cache access.

6. The method of claim 1, further comprising:
   monitoring demand cache accesses for the thread to maintain a second running count of a number of times demand cache accesses for the thread are directed to cachelines that are adjacent in a second direction to cachelines that are targets of the set of sampled cache accesses for the thread; and
   in response to determining the second running count has exceeded a second threshold, enabling a second prefetching mode in which a received demand cache access for the thread triggers a prefetch request for a cacheline adjacent in the second direction to a cacheline targeted by the received demand cache access.

7. In a processing system comprising a cache, a method comprising:
   sampling a stream of cache accesses for a thread based on a percentage of cache accesses by the thread by prioritizing sampling of cache accesses that result in cache misses at the cache over cache accesses that result in cache hits at the cache by sampling more frequently from cache misses than from cache hits;
   for each sampled cache access, storing to a corresponding entry of an address buffer an address representative of a cacheline targeted by the sampled cache access;
   for each demand cache access of a plurality of demand accesses for the thread:
      in response to determining an address of the demand cache access is adjacent in a first direction to an address stored in an entry of the address buffer, incrementing a first count associated with the entry; and
      in response to determining the address of the demand cache access is adjacent in a second direction to an address stored in an entry of the address buffer, incrementing a second count associated with the entry;
   in response to a trigger event, determining a first total count by summing the first counts associated with the entries of the address buffer and determining a second total count by summing the second counts associated with the entries of the address buffer;
   in response to determining the first total count has exceeded a first threshold, enabling a first prefetching mode in which a received demand cache access for the thread triggers a prefetch request for a cacheline adjacent in the first direction to a cacheline targeted by the received demand cache access; and
   in response to determining the second total count has exceeded a second threshold, enabling a second prefetching mode in which a received demand cache access for the thread triggers a prefetch request for a cacheline adjacent in the second direction to a cacheline targeted by the received demand cache access.

8. The method of claim 7, further comprising:
   in response to the first prefetching mode being enabled and in response to receiving a demand cache access for the thread, identifying a cacheline that is adjacent in the first direction to a cacheline targeted by the demand cache access and issuing a prefetch request for the identified cacheline; and
   in response to the second prefetching mode being enabled and in response to receiving a demand cache access for the thread, identifying a cacheline that is adjacent in the second direction to a cacheline targeted by the demand cache access and issuing a prefetch request for the identified cacheline.

9. The method of claim 8, further comprising:

in response to the first prefetching mode being enabled, in response to receiving a demand cache access for the thread, and in response to an indication that no other prefetcher of the processing system is issuing a prefetch request for the demand cache access, identifying a cacheline that is adjacent in the first direction to a cacheline targeted by the demand cache access and issuing a prefetch request for the identified cacheline; and in response to the second prefetching mode being enabled, in response to receiving a demand cache access for the thread, and in response to an indication that no other prefetcher of the processing system is issuing a prefetch request for the demand cache access, identifying a cacheline that is adjacent in the second direction to a cacheline targeted by the demand cache access and issuing a prefetch request for the identified cacheline.

10. A system comprising:

a cache comprising a cache controller to process cache accesses; and an up/down prefetcher coupled to the cache controller, the up/down prefetcher to:

sample demand cache accesses for a thread based on a percentage of cache accesses by the thread by prioritizing sampling of cache accesses that result in cache misses at the cache over cache accesses that result in cache hits at the cache by sampling more frequently from cache misses than from cache hits;

maintain a first running hit count of a number of times demand cache accesses for the thread are directed to cachelines that are adjacent in a first direction to cachelines that are targets of a set of sampled cache accesses for the thread; and in response to determining the first running hit count has exceeded a first threshold, implement a first prefetching mode in which a received demand cache access for the thread triggers a prefetch request to the cache controller for a cacheline adjacent in the first direction to a cacheline targeted by the received demand cache access.

11. The system of claim 10, wherein the first direction comprises a next cacheline direction.

12. The system of claim 10, wherein the first direction comprises a previous cacheline direction.

13. The system of claim 10, wherein the up/down prefetcher comprises:

a sampling module to sample cache accesses for the thread according to a sampling scheme to determine a set of sampled cache accesses that includes the sampled cache access.

14. The system of claim 13, wherein the up/down prefetcher further comprises:

an address buffer coupled to the sampling module and having a plurality of entries configured to store addresses associated with the cachelines targeted by the sampled cache accesses; and a hit buffer coupled to the address buffer and having a plurality of entries, each entry of the hit buffer associated with a corresponding entry of the address buffer and configured to store a first hit count representing a number of times a demand cache access for the thread has been targeted to a cacheline that is adjacent in the first direction to the cacheline represented by the address stored in the associated entry of the address buffer.

15. The system of claim 14, wherein the up/down prefetcher further comprises:

a hit summation module coupled to the hit buffer, the hit summation module to determine the first running hit count based on a summation of the first hit counts of the plurality of entries of the hit buffer.

16. The system of claim 15, wherein the up/down prefetcher further comprises:

a compare module coupled to the hit summation module, the compare module to enable implementation of the first prefetching mode responsive to a comparison of the first running hit count to the first threshold.

17. The system of claim 10, wherein the up/down prefetcher further is to:

monitor demand cache accesses for the thread to maintain a second running hit count of a number of times demand cache accesses for the thread are directed to cachelines that are adjacent in a second direction to cachelines that are targets of the set of sampled cache accesses for the thread, and in response to determining the second running hit count has exceeded a second threshold, to implement a second prefetching mode in which a received demand cache access for the thread triggers a prefetch request to the cache controller for a cacheline adjacent in the second direction to a cacheline targeted by the received demand cache access.

* * * * *